United States Patent [19]
Dam et al.

[11] Patent Number: 5,912,400
[45] Date of Patent: Jun. 15, 1999

[54] METHOD FOR REFORMING REDUCING GAS IN A FLUIDIZED BED PROCESS FOR REDUCTION OF ORE

[75] Inventors: Oscar G. Dam; Wolfgang A. Albarran, both of Puerto Ordaz, Venezuela

[73] Assignee: Brifer International Ltd., Bridgetown, Barbados

[21] Appl. No.: 08/982,744

[22] Filed: Dec. 2, 1997

[51] Int. Cl.[6] ................................................. C21B 11/00
[52] U.S. Cl. ................................................. 75/450; 75/444
[58] Field of Search ................ 75/450, 444; 266/156, 266/172

[56] References Cited

U.S. PATENT DOCUMENTS

| | | | |
|---|---|---|---|
| 3,246,978 | 4/1966 | Porter, Jr. et al. | 75/450 |
| 3,910,769 | 10/1975 | Mayer et al. | 75/444 |
| 3,985,547 | 10/1976 | Iacotti et al. | 75/444 |
| 5,064,467 | 11/1991 | Dam G. et al. | 75/495 |
| 5,082,251 | 1/1992 | Whipp | 266/142 |
| 5,185,032 | 2/1993 | Whipp | 75/450 |
| 5,192,486 | 3/1993 | Whipp | 266/156 |
| 5,382,277 | 1/1995 | Rose | 75/450 |
| 5,439,504 | 8/1995 | Czermak et al. | 75/444 |

*Primary Examiner*—Scott Kastler
*Attorney, Agent, or Firm*—Bachman & LaPointe, P.C.

[57] ABSTRACT

A method for reforming reducing gas in a fluidized bed process for reduction of ore in a series of ore reducing reactors, including the steps of: passing ore through a plurality of reducing reactors including a final reactor and at least one upstream reactor; flowing a reducing gas through the final reactor so as to reduce ore in the final reactor whereby a flow of partially spent reducing gas including methane and metallized iron dust exits the final reactor; mixing an oxygen source with the partially spent reducing gas so as to combust a portion of the methane with the oxygen source in the presence of the metallized iron dust and provide a reformed reducing gas; and flowing the reformed reducing gas to the upstream reactor.

24 Claims, 1 Drawing Sheet

METHOD FOR REFORMING REDUCING GAS IN A FLUIDIZED BED PROCESS FOR REDUCTION OF ORE

BACKGROUND OF THE INVENTION

The invention relates to fluidized bed processes for reduction of iron ore and, more specifically, to a method for reforming the reducing gas used in the process.

U.S. Pat. No. 5,192,486 to Whipp is drawn to a plant and process for fluidized bed reduction of ore. This patent is representative of a process wherein iron oxide is passed through a series of ore reactors and contacted with reducing gas so as to provide a reduced or metallized iron product. Reducing gas for such processes is typically produced in special plants known as reformers. Typical reforming units are of the stoichiometric type, and use natural gas/carbon monoxide mixtures, steam reforming and partial combustion. Units for carrying out the first two types of reforming, specifically natural gas/carbon monoxide reforming and steam reforming, are very costly and use expensive catalysts.

The partial combustion method also has certain drawbacks, for example, the sulfur content of heavy hydrocarbons typically used as fuel tend to contaminate the metal products, and carbon deposition on relevant equipment is also a problem. Furthermore, in these processes, nitrogen builds up in the reactors and reducing gas, adversely affecting reducing quality of the gas.

In fluidized bed processes such as that disclosed in Whipp '486 ore is passed sequentially downwardly through a series of reactors while gas is passed serially upstream through the same reactors. It has been found that gas passing through the reactors entrains dust and particulate matter from the ore material being reduced, which dust or particulate matter can cause severe plugging and other complications in the reactor.

In light of the foregoing, it is clear that the need remains for a process wherein reducing gas is provided and the fluidized bed reduction process is carried out at reduced cost, with increased efficiency and with less tendency for plugging.

It is therefore the primary object of the present invention to provide a method for producing reducing gas for use in the fluidized bed process without expensive reforming equipment.

It is a further object of the present invention to provide a method for producing reducing gas in a manner which utilizes heat already present in the fluidized bed process so as to increase efficiency of the overall process.

It is another object of the present invention to provide a method for producing reducing gas in connection with a fluidized bed process which takes advantage of particulate or dust material entrained in partially spent gas, and which further inhibits the tendency toward excessive accretion or plugging in reactor equipment.

Still other objects and advantages of the present invention will appear hereinbelow.

SUMMARY OF THE INVENTION

In accordance with the present invention, the foregoing objects and advantages are readily attained.

According to the invention, a method is provided for reforming reducing gas in a fluidized bed process for reduction of ore in a series of ore reducing reactors, which method comprises the steps of passing ore through a plurality of reducing reactors including a final reactor and at least one upstream reactor; flowing a reducing gas through said final reactor so as to reduce ore in said final reactor whereby a flow of partially spent reducing gas including methane and metallized iron dust exits said final reactor; mixing an oxygen source with said partially spent reducing gas so as to combust a portion of said methane with said oxygen source in the presence of said metallized iron dust and provide a reformed reducing gas; and flowing said reformed reducing gas to said at least one upstream reactor.

Still further according to the invention, a method is provided for forming reducing gas during pre-heat of he reactors to process temperature so as to provide a beneficial pre-reduction of ore.

BRIEF DESCRIPTION OF DRAWINGS

A detailed description of a preferred embodiment of the present invention follows, with reference to the attached drawings, wherein.

DETAILED DESCRIPTION

The present invention relates to fluidized bed processes for the reduction of iron ore and, more specifically, to a method for improving or reforming reducing gas in connection with the fluidized bed process.

Figure 1:
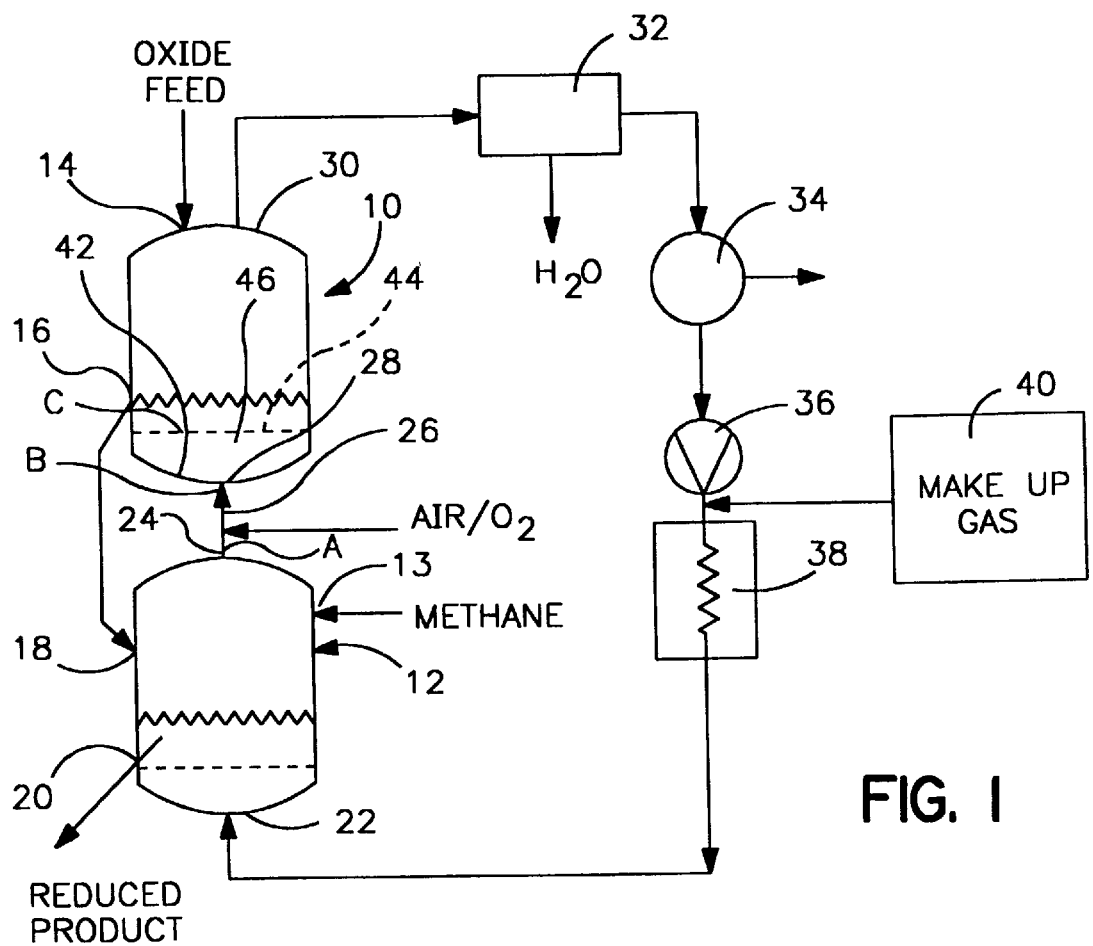
FIG. 1 is a schematic illustration of a process in accordance with the present invention.

FIG. 1 shows schematically a system for fluidized bed reduction of ore which will be referred to in description of the process of the present invention. FIG. 1 shows two ore reactors 10, 12 which are used to contact an iron oxide feed with a reducing gas so as to produce a reduced or metallized iron product. Reactor 10 is preferably provided with an inlet 14 for receiving oxide ores to be reduced, and an ore outlet 16 for reduced or partially reduced product, while reactor 12 is preferably provided with an ore inlet 18 and a final product outlet 20. As shown in the drawings, inlet 18 of reactor 12 is preferably connected serially to outlet 16 of reactor 10 so that ore fed through reactor 10 is then passed serially, for example by gravity, to reactor 12. Thus, reactor 10 will be referred to herein as an upstream reactor while reactor 12 will be referred to as the final reactor. It should be noted that FIG. 1 is a schematic illustration and the present invention is not limited by the number of reactors. Thus, although two single bed reactors are schematically shown in FIG. 1, three or more single bed reactors could be used, or alternatively a single multi stage reactor wherein each stage or bed is considered to be a reactor as set forth herein could be used, or combinations of these types of reactors with each other and/or with one or more pre-heat reactors could be used, all within the scope of the present invention.

During the process of the present invention, iron oxide fed to reactors, 10, 12 is contacted with a reducing gas, which is preferably rich in hydrogen and carbon monoxide, at conditions selected so as to remove oxygen from the iron oxide thereby providing a metallized or reduced iron product. Reducing gas is preferably fed in a counter direction to the iron oxide, for example through a gas inlet 22 of reactor 12, to a gas outlet 24 of reactor 12, through line 26 to a gas inlet 28 of reactor 10 and finally from gas outlet 30 of reactor 10. U.S. Pat. No. 5,192,486 to Whipp discloses a system using three reactors connected as above, and is incorporated herein by reference. Thus, gas passes serially from reactor 12 to reactor 10, and reactor 10 may be referred to herein as a gas downstream reactor.

Reducing gas initially fed to the reactor, for example fed to gas inlet 22 of final reactor 12, preferably has a gas composition by volume of about 60–65% hydrogen, 4–6% carbon monoxide, 18–24% methane, 2–4% carbon dioxide, and 1.0–1.8% water vapor, and nitrogen balance. This gas is preferably fed to gas inlet 22 of reactor 12 at a temperature of between about 830° C. to about 850° C. Within reactor 12, a portion of the reducing gas will be oxidized while iron oxides are reduced, resulting in a partially spent gas exiting reactor 12.

As will be discussed below, the partially spent gas is treated in accordance with the present invention so as to improve its reducing power for reduction in upstream reactor 10, thereby improving the overall results of the process.

After passing through gas downstream reactor 10, or the last gas downstream reactor, spent gas is removed from gas outlet 30 and typically treated at various stations so as to remove water vapor and carbon dioxide, and to compress and heat the gas sufficiently for re-use in the process. In this regard, spent gas may be fed sequentially to a gas quench or water removal assembly 32, a scrubber 34 for removing $CO_2$ and $H_2S$ and to a compressor 36 and heater 38 for conditioning recycled gases for re-use in the fluidized process. As shown, gases recirculated through water removal unit 32, scrubber 34, compressor 36 and heater 38 may suitably be mixed with an additional or make up reducing gas from a reducing gas preparation unit 40 as shown, which may suitably be a commercial type of reforming unit. Suitable make up gases include reducing gas, oxidant and mixtures thereof. Make up gas may preferably be mixed with recycled gas prior to heater 38, as shown. The mixture of recycled and make up gases is then fed to gas inlet 22 of reactor 12 for additional treatment of oxides within reactor 10, 12.

Gas passing through reactors 10, 12 tends to entrain dust or particulate matter from iron oxide being treated in the reactor. The gas carries this dust through gas-downstream components of the system. This particulate matter or dust tends to accrete on various surfaces of the system and has caused significant plugging problems in connection with conventional reactor equipment. In accordance with the present invention, it has been found that this particulate matter, which from the final reactor 12 is to a large extent metallized iron dust, can be used under proper conditions as a catalyst for reforming partially spent gas from the final reactor 12 so as to increase the reducing power of gas fed to upstream reactor 10. Further, it has been found that the reformation reaction serves to reduce the temperature of the gas and/or surrounding areas sufficiently that accretion of dust particles, after an initial stage, is significantly inhibited so as to avoid the plugging problems experienced conventionally.

Thus, in accordance with the invention, partially spent gas from reactor 12 is mixed with oxygen, and preferably additional methane, in the presence of the entrained iron and oxide dust, so as to combust the resulting mixture, thereby providing additional heat needed for the desired reformation reaction, which provides reducing gas to reactor 10 having greater reducing power. In this step, the addition of methane, for example through an inlet 13 to reactor 12, serves to enhance combustion after mixture with air/oxygen, and further provide additional materials for the hydrogen and carbon monoxide producing reactions.

FIG. 1 shows a source of oxygen communicated with partially spent gas from gas outlet 24 of final reactor 12, for example in line 26, so as to partially combust a portion of methane within the partially spent gas, thereby generating the additional heat which is used in the subsequent reforming reaction in the presence of the reduced metal dust catalyst, as set forth above. The oxygen source to be added to line 26 to combust partially reduced gas is preferably pre-heated to a temperature between about 650° C. to about 950° C. The initial combustion in line 26 forms carbon dioxide and water vapor from combusted methane, and the subsequent reforming reaction with additional methane in the gas mixture is a reaction catalyzed by the reduced metal particles so as to provide carbon monoxide and hydrogen as desired in accordance with the present invention.

Figure 2:
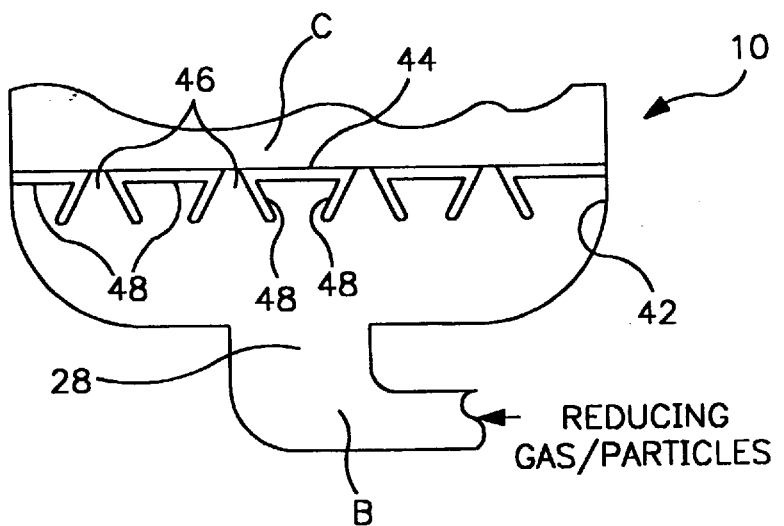
FIG. 2 is an enlarged schematic illustration of a portion of a reactor of the system of FIG. 1.

Referring to FIG. 2, an enlarged portion of gas inlet 28 and reactor 10 is shown so as to further illustrate an advantageous feature of the present invention. As discussed above, particulate matter entrained by gases passing from reactor to reactor has conventionally caused serious problems due to accretion to the point of plugging the system, which leads to process inefficiency due to required shut-downs for cleaning and the like. In accordance with the invention, it has been found that by introducing an oxygen source to line 26 so as to partially combust methane in the partially spent reducing gases, an initial layer of reduced metal dust will accrete or accumulate on surfaces with which the gas and entrained dust come into contact, especially on refractory interior surface 42 of reactor 10, gas flow grid 44 and gas flow nozzles 46 within the plenum or lower areas of rector 10 as shown. It has further been found in accordance with the present invention, that the reforming reaction catalyzed by the metallized iron dust entrained in the gas and the accreted metallized dust on surfaces 42, 44 and 46 is an endothermic reaction which utilizes heat provided by combustion of the gases so as to cool gases contacting surfaces 42, 44 and 46, thereby inhibiting further accretion of such reduced metal particles. Thus, the method in accordance with the present invention provides for an initial stage of operation wherein a desired portion of reduced metal dust is accreted on various surfaces of reactor 10, and a second, cooler stage of operation wherein a reduced temperature is brought on by the endothermic reforming reaction. This reduced temperature serves advantageously to inhibit further dust accretion, thereby significantly reducing the tendency toward plugging and increasing the efficiency of the process.

Gas reformation according to the invention begins in line 26 in the presence of entrained reduced metal dust or particles which serve as a catalyst for the reforming reaction. Furthermore, as the gas from line 26 enters the plenum or lower areas of reactor 10, this gas also contacts accreted reduced metal dust 48 which has a relatively large specific surface area, for example between about 15 $cm^2/gr$ to about 80 $cm^2/gr$, which serves as a second catalyst zone or surface for encouraging further gas reformation reactions.

In accordance with the invention, partially spent gas leaving final reactor 12 may typically have a gas composition by volume of about 48–52% hydrogen, 6–10% carbon monoxide; 20–27% methane, 1.0–1.5% carbon dioxide, 10–12% water vapor, nitrogen balance, a reducing power (NR as defined hereinbelow) of between about 4.0 to about 5.6, and a temperature of between about 750° C. and about 790° C.

Reformation of partially spent gas is initiated before feeding to reactor 10, and continues through the lower areas of reactor 10 so that a reformed reducing gas contacts ore in reactor 10 after passing through grid 44. Reformation is begun by mixing an oxygen source with the partially spent gas and entrained reduced metal dust so as to provide a combusted gas at the inlet (Point B) to reactor 10 having a composition by volume of about 40–46% hydrogen; 6–8% carbon monoxide; 17–20% methane; 3–6% carbon dioxide; 12–18% water vapor nitrogen balance, and a temperature of between about 780° C. and about 820° C.

Combusted gases having the compositions as set forth above then pass from line 26 into inlet 28 of reactor 10 and thus into contact with accreted reduced iron dust particles 48 on surfaces of the reactor, especially refractory interior surface 42, gas flow grid 44 and gas flow nozzles 46, and is further reformed so as to provide reformed reducing gas downstream of grid 44, for example at Point C, which has a composition by volume of about 50–62% hydrogen; 12–20% carbon monoxide; 4–12% methane; 1–4% carbon dioxide; 8–10% water vapor; nitrogen balance, a reducing power (Nr as defined hereinbelow) of between about 4.4 to about 9.1, and a temperature of between about 780° C. to about 800° C.

Reducing gas from Point C then proceeds to flow through reactor 10 so as to reduce or metallize oxide fed to reactor 10 as desired in accordance with the present invention.

To further illustrate the advantageous gas reformation provided according to the present invention, preferred gas compositions corresponding to Points A, B and C, as well as reducing gas initially fed to the reactors, are set forth in Table 1 below.

TABLE 1

|  | IN | A | B | C |
|---|---|---|---|---|
| $H_2\%V$ | 60–65 | 48–52 | 40–46 | 50–62 |
| $CO\%v$ | 4–6 | 6–10 | 6–8 | 12–20 |
| $CH_4\%V$ | 18–24 | 20–27 | 17–20 | 4–12 |
| $CO_2\%V$ | 2–4 | 1.0–1.5 | 3–6 | 1–4 |
| $H_2O\%V$ | 1.0–1.8 | 10–12 | 12–18 | 8–10 |
| $N_2\%v$ | balance | balance | balance | balance |
| Temp (°C.) | 830–850 | 750–790 | 780–820 | 780–800 |

The gas compositions set forth above are representative of gas into the system, for example at inlet 22 of reactor 12, partially spent gas after passing through final reactor 12, for example at Point A in FIG. 1, combusted gas after addition of oxygen, for example at Point B in FIG. 1, and reformed gas after the intermediate reformation stage of the present invention, for example at Point C in FIG. 1.

As shown, the process of the present invention serves to increase the volume of reducing gas in the reformed reducing gas by about 10%–40% volume as compared to the partially spent reducing gas, thereby increasing the reducing power (NR) of the gas, for example from a reducing power of about 4.4 at Point A to a reducing power of about 6.2 at Point C, wherein reducing power is defined as follows:

$$N_R = (CO+H_2)/(CO_2+H_2O)$$

wherein CO, $H_2$, $CO_2$ and $H_2O$ are % volumes of the gas.

In accordance with the present invention, an oxygen source such as air, oxygen or mixtures thereof to be introduced into line 26 is preferably provided so as to provide a reformation ratio ($CH_4/N_{Ox}$) of between about 57 and about 72, wherein $CH_4$ is the % volume of methane, and $N_{Ox}$ is the degree of oxidation in the partially spent gas stream, which is defined as follows:

$$N_{Ox} = (CO_2+H_2O)/(CO+CO_2+H_2+H_2O)$$

wherein CO, $H_2$, $CO_2$ and $H_2O$ are % volumes in the gas stream. $N_{Ox}$ typically ranges from between about 0.2 to about 0.3.

Furthermore, the flow and temperature conditions of the present invention are preferably manipulated so to provide an amount of entrained dust and gas exiting from gas outlet 24 of reactor 12 in an amount of between about 5 $g/m^3$ to about 50 $g/m^3$, preferably between about 10 $g/m^3$ and about 30 $g/m^3$.

The entrained dust particles and accreted particles 48, preferably have a composition by weight of about 78–85% reduced iron; 0.1–0.6% calcium oxide; 0.1–0.3% magnesium oxide; 0.9–2.5% silica; 0.5–1.8% alumina and 12–20% iron oxide. Furthermore, the accreted particles preferably have a specific surface area of between about 3 $cm^2/gr$ to about 10 $cm^2/gr$.

As set forth above, the method of the present invention operates at a first stage wherein dust or particles are accreted so as to provide catalyst surfaces where desired, for example on surfaces 42, 44, and a second reduced temperature stage wherein accretion of dust or particles on such surfaces is reduced. In this regard, reactor temperature below grid 44, at surfaces 42, 44, during the first stage of operation is preferably between about 780° C. and about 790° C., and this temperature during the second stage is preferably between about 760° C. and about 770° C.

Furthermore, the process of the present invention enhances the heat efficiency of the iron reduction process by utilizing heat from the partially spent gas from reactor 12 to bring about the gas reformation reaction, and thereby also provide a hotter gas to upstream reactor 10 than would normally be provided. This advantageously allows reactors 10, 12 to be operated at temperatures which are substantially the same, preferably having a temperature difference of less than or equal to about 20° C.

As set forth above, accretion problems in conventional processes are most acute in the vicinity of the last or final reactor, as this is where dust particles have the highest degree of reduction or metallization. The present invention takes advantage of this fact in using these particles as a catalyst, and limits excessive accretion of same.

Furthermore, excess build up of methane or methanization between reactors, a problem commonly experienced in conventional processes, is substantially avoided in connection with the present method since a portion of the methane between reactors is combusted and a further portion is reformed to provide additional reducing gas.

Before normal operation of the reduction process, it is preferred that the reactors be heated to a process temperature of preferably about 900° C. Operation below this temperature has been found to encourage the methanation of reducing gas, thereby decreasing process efficiency. It has been found that the process of the present invention advantageously provides for production of reducing gas during the pre-heating of the reactors to process temperature, advantageously providing for pre-reduction of iron during start up of the process. While the reactors are being heated to process temperature, according to the invention, a mixture of inert gas and methane is preferably passed through the reactors, and this mixture entrains iron and iron oxide dust from reactor 12 as set forth above. Added oxygen between reactors 12, 10 combusts a portion of methane in the inert gas/methane mixture, providing additional heat for reformation of remaining methane into reducing gas including hydrogen and carbon monoxide as desired. This gas flows to reactor 10, where pre-reduction of oxides during the heating or start up of the system is accomplished, while avoiding excess methanation which might normally occur during start up. The pre-reducing process is preferably begun when reactor temperature, preferably the temperature of upstream reactor 10, reaches a temperature of about 700° C., and is continued until the desired process temperature is reached.

Referring to FIG. 1, the pre-reduction process of the present invention may suitably be carried out by feeding the inert gas/methane mixture to inlet 22, and by feeding a source of gaseous oxygen to line 26 to mix with and partially combust inert gas/methane with entrained iron dust exiting reactor 12. The resulting increased temperature in the presence of entrained and accreted iron dust serves to reform remaining methane to provide reducing gas in upstream reactor 10, thereby providing for pre-reduction of iron oxides in reactor 10.

Once the temperature reaches process temperature, preferably about 900° C., additional methane may be added to inlet 13 as described above, and inert gas may be phased out to the mixture of recycled gas and makeup gas to be supplied to inlet 22 of reactor 12 as desired. During the initial heat up or start up period, which may typically last about 1–3 hours, the present process provides beneficial reduction of iron oxides which may not otherwise be provided.

In light of the foregoing, it should readily be appreciated that a method has been provided wherein the production of reducing gas is carried out at increased efficiency and using less expensive equipment, and further that the overall process of reduction of iron using the method of the present invention is carried out in an efficient manner and with reduced problems such as plugging and the like. Further, benefits are obtained during the pre-heat or start up procedure as well.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A method for reforming reducing gas in a fluidized bed process for reduction of ore in a series of ore reducing reactors, comprising the steps of:
   passing ore through a plurality of reducing reactors comprising a final reactor and at least one upstream reactor;
   flowing a reducing gas through said final reactor so as to reduce ore in said final reactor whereby a flow of partially spent reducing gas including methane and metallized iron dust exits said final reactor;
   mixing an oxygen source with said partially spent reducing gas so as to combust a portion of said methane with said oxygen source in the presence of said metallized iron dust and provide a reformed reducing gas; and
   flowing said reformed reducing gas to said upstream reactor.

2. A method according to claim 1, wherein said partially spent reducing gas has a reducing power ($N_R$) of 4.5, and wherein said reformed reducing gas has a reducing power of 6.2, wherein reducing power is defined as follows:

$$N_R = (H_2 + CO)/(H_2O + CO_2),$$

and wherein $H_2$, CO, $H_2O$ and $CO_2$ are % volumes from said partially spent reducing gas and said reformed reducing gas.

3. A method according to claim 1, wherein said partially spent reducing gas from said final reactor has a composition by volume of about 48–52% hydrogen, 6–10% carbon monoxide, 20–27% methane, 1.0–1.5% carbon dioxide, 10–12% water vapor, balance nitrogen, and a temperature of between about 750° C. and about 790° C., and wherein said reformed reducing gas has a composition by volume of about 50–62% hydrogen, 12–20% carbon monoxide, 4–12% methane, 1–4% carbon dioxide, 8–10% water vapor, balance nitrogen, and a temperature of between about 780° C. and about 800° C.

4. A method according to claim 3, wherein said mixing step provides a partially combusted mixture having a composition by volume of 40–46% hydrogen, 6–8% carbon monoxide, 17–20% methane, 3–6% carbon dioxide, 12–18% water vapor, balance nitrogen, and having a temperature of between about 780° C. and about 820° C.

5. A method according to claim 1, wherein said partially spent reducing gas contains said metallized iron dust in an amount between about 5 g/m$^3$ and about 50 g/m$^3$.

6. A method according to claim 5, wherein said metallized iron dust comprises between about 78 and about 85% wt metallic iron.

7. A method according to claim 1, wherein said final reactor and said upstream reactor are connected by a gas line for conveying said partially spent reducing gas, and wherein said oxygen source is introduced into said gas line for mixing with said partially spent reducing gas.

8. A method according to claim 7, wherein said oxygen source is selected from the group consisting of air, oxygen and mixtures thereof.

9. A method according to claim 1, wherein said mixing step provides a partially combusted gas mixture entering said upstream reactor, and wherein said upstream reactor has internal surfaces with which said partially combusted gas mixture is contacted, and further comprising the steps of operating said process so as to accrete said metallized iron dust on said surfaces, thereby providing accreted metallized iron dust on said surfaces, whereby said accreted metallized iron dust acts as a catalyst for reforming said partially combusted gas mixture into said reformed reducing gas.

10. A method according to claim 9, wherein said accreted metallized iron dust has a composition by weight of about 78–85% metallic iron, 0.1–0.6% calcium oxide, 01.0.3% magnesium oxide, 0.9–2.5% silica, 0.5–1.8% alumina and 12–20% iron oxide.

11. A method according to claim 9, wherein said accreted metallized iron dust has a specific surface area of between about 3 cm$^2$/gr to about 10 cm$^2$/gr.

12. A method according to claim 9, wherein said process includes an initial stage wherein said upstream reactor is at a temperature of between about 780° C. and about 790° C., and wherein said metallized iron dust accretes on said surfaces, and a subsequent stage wherein said upstream reactor is at a temperature of between about 760° C. and about 770° C. whereby further accretion of said metallized iron dust is inhibited.

13. A method according to claim 1, wherein said mixing step includes mixing said oxygen source with said partially spent reducing gas so as to provide a mixture having a reformation ratio ($CH_4/N_{Ox}$) of between about 57 and 72, wherein $CH_4$ is % volume of methane, and $N_{Ox}$ is defined as follows:

$$N_{Ox} = (CO_2 + H_2O)/(CO + CO_2 + H_2 + H_2O)$$

and wherein CO, $CO_2$, $H_2$, and $H_2O$ are % volumes in said mixture.

14. A method according to claim 1, wherein said final reactor and said upstream reactor are operated at a temperature difference of less than or equal to about 20° C.

15. A method according to claim 1, wherein said mixing step is carried out under conditions selected so that said metallized iron dust acts as a catalyst of a reforming reaction of methane in said partially spent reducing gas.

16. A method according to claim 1 further comprising the step of adding additional methane to said partially spent reducing gas before said mixing step.

17. A method according to claim 1, wherein said reactors are operated at a process temperature, and further comprising a pre-heating process wherein said reactors are heated to said process temperature, and comprising the steps of:
   (a) flowing a mixture of inert gas and methane through said final reactor so as to contact ore in said final reactor whereby a flow of gas including said inert gas, said methane and entrained iron dust exits said final reactor;
   (b) mixing an oxygen source with said flow of gas so as to combust a portion of said methane with said oxygen source in the presence of said iron dust so as to provide a reducing gas including hydrogen and carbon monoxide; and
   (c) flowing said reducing gas to said upstream reactor so as to pre-reduce said ore in said upstream reactor.

18. A method according to claim 17, further comprising carrying out steps (a)–(c) while said upstream reactor is at a temperature of between about 700° C. and said process temperature.

19. A method according to claim 18, wherein said process temperature is about 900° C.

20. A method for forming reducing gas during pre-heating to process temperature in a fluidized bed process for reduction of ore in a series of ore reducing reactors, comprising the steps of:
   (a) flowing a mixture of inert gas and methane through said final reactor so as to contact ore in said final reactor whereby a flow of gas including said inert gas, said methane and entrained iron dust exits said final reactor;
   (b) mixing an oxygen source with said flow of gas so as to combust a portion of said methane with said oxygen source in the presence of said iron dust so as to provide a reducing gas including hydrogen and carbon monoxide; and
   (c) flowing said reducing gas to said upstream reactor so as to pre-reduce said ore in said upstream reactor.

21. A method according to claim 20, further comprising carrying out steps (a)–(c) while said upstream reactor is at a temperature of between about 700° C. and said process temperature.

22. A method according to claim 21, wherein said process temperature is about 900° C.

23. A method according to claim 1 wherein said partially spent reducing gas has a reducing power (Nr) of between about 4.0 to about 5.6.

24. A method according to claim 1 wherein said reformed gas has a reducing power (Nr) of between about 4.4 to about 9.1.

* * * * *

UNITED STATES PATENT AND TRADEMARK OFFICE
CERTIFICATE OF CORRECTION

PATENT NO. : 5,912,400
DATED : June 15, 1999
INVENTOR(S) : OSCAR G. DAM ET AL.

It is certified that error appears in the above-identified patent and that said Letters Patent is hereby corrected as shown below:

In column 8, claim 10, line 3, change "01.0.3%" to read --0.1-0.3%--.

Signed and Sealed this

Fourteenth Day of December, 1999

Attest:

Attesting Officer

Q. TODD DICKINSON

Acting Commissioner of Patents and Trademarks